US009690177B2

United States Patent
Horiko et al.

(10) Patent No.: US 9,690,177 B2
(45) Date of Patent: Jun. 27, 2017

(54) LIGHTING DEVICE, PROJECTOR, LIGHT-SOURCE-DEVICE SUPPORTING INSTRUMENT, AND LIGHT SOURCE CARTRIDGE

(71) Applicant: Seiko Epson Corporation, Tokyo (JP)

(72) Inventors: Yukihiro Horiko, Matsumoto (JP); Takahiro Miyata, Matsumoto (JP); Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/186,638

(22) Filed: Jun. 20, 2016

(65) Prior Publication Data

US 2016/0377964 A1 Dec. 29, 2016

(30) Foreign Application Priority Data

Jun. 23, 2015 (JP) ................. 2015-125410

(51) Int. Cl.
G03B 21/16 (2006.01)
G03B 21/20 (2006.01)
F21S 8/10 (2006.01)

(52) U.S. Cl.
CPC ............. *G03B 21/16* (2013.01); *F21S 48/32* (2013.01); *G03B 21/2093* (2013.01); *G03B 21/2013* (2013.01); *G03B 21/2066* (2013.01)

(58) Field of Classification Search
CPC .... G03B 21/20; G03B 21/16; G03B 21/2046; G03B 21/2093; G03B 21/05; F21S 48/32; F21S 48/321; F21S 48/323; F21S 48/325; F21V 29/002; F21V 29/02
See application file for complete search history.

(56) References Cited

U.S. PATENT DOCUMENTS

| 2013/0182229 | A1 | 7/2013 | Saruwatari et al. |
| 2016/0363845 | A1* | 12/2016 | Yuto ...................... G03B 21/16 |
| 2016/0363846 | A1* | 12/2016 | Takizawa ............... G03B 21/16 |
| 2016/0363848 | A1* | 12/2016 | Takizawa ............... G03B 21/16 |
| 2017/0051897 | A1* | 2/2017 | Takizawa ............ F21V 19/0075 |

FOREIGN PATENT DOCUMENTS

| JP | 2003-29337 A | 1/2003 |
| JP | 2010-181456 A | 8/2010 |
| JP | 2013-148625 A | 8/2013 |
| JP | 2013-218101 | 10/2013 |

* cited by examiner

*Primary Examiner* — William C Dowling
(74) *Attorney, Agent, or Firm* — ALG Intellectual Property, LLC

(57) ABSTRACT

A lighting device includes a supporting section configured to support a light source device unit, a fan housing section in which an outflow port for causing the air discharged by a cooling fan to flow out is formed, and a circulating device supported by the light source device unit. The outflow port is opened in a direction along a second direction. The light source device unit includes an inflow port opened to a side opposed to the outflow port and a channel for leading the air flowing in from the inflow port to a light source. The circulating device includes a moving section disposed between the light source device unit and the fan housing section in a predetermined position, a ventilation hole for causing the outflow port and the inflow port to communicate being formed in the moving section, and an urging section configured to urge the moving section.

19 Claims, 10 Drawing Sheets

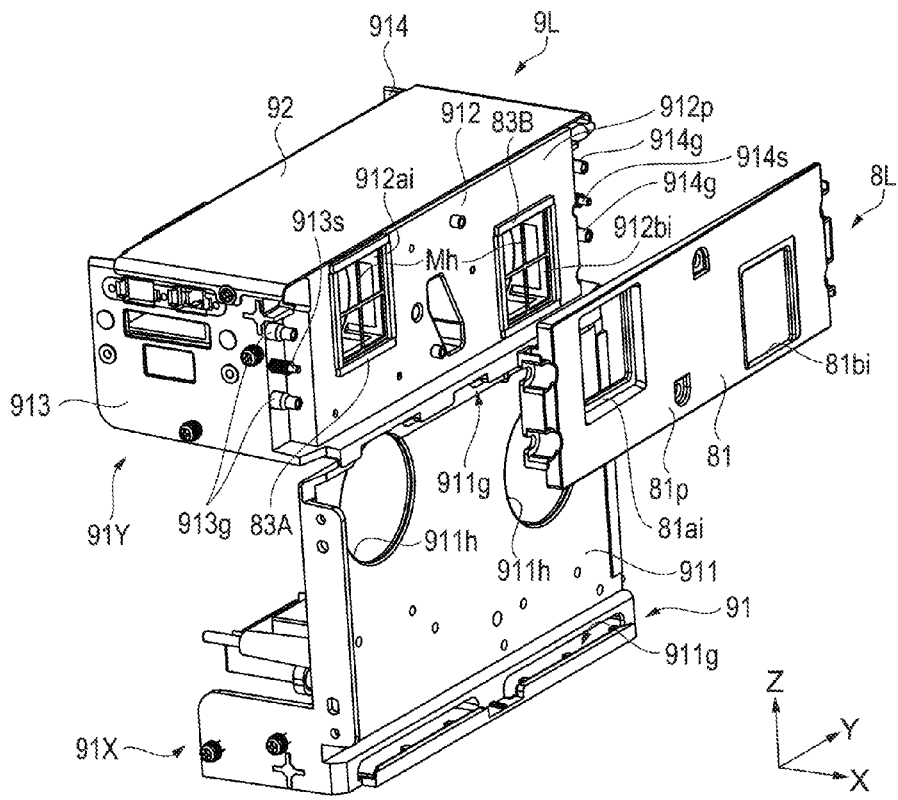
FIG. 9A
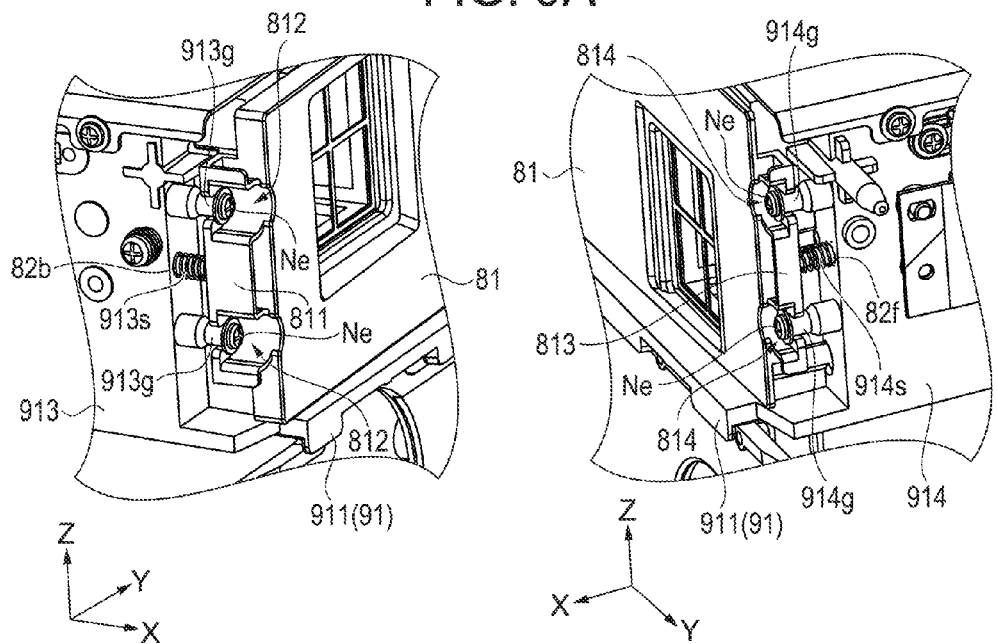
FIG. 9B
FIG. 9C

LIGHTING DEVICE, PROJECTOR, LIGHT-SOURCE-DEVICE SUPPORTING INSTRUMENT, AND LIGHT SOURCE CARTRIDGE

CROSS-REFERENCE TO RELATED APPLICATION

The entire disclosure of Japanese Patent Application No. 2015-125410, filed Jun. 23, 2015 is expressly incorporated by reference herein.

BACKGROUND

1. Technical Field

The present invention relates to a lighting device, a projector, a light-source-device supporting instrument, and a light source cartridge.

2. Related Art

There has been known a projector that modulates, according to image information, light emitted from a light source and projects the modulated light on a projection surface such as a screen. There has been proposed a device including a plurality of light sources in order to project a brighter image and configured to cool the light sources (see for example, JP-A-2013-218101 (Patent Literature 1)).

The device (a lamp unit) described in Patent Literature 1 includes a lamp fan base, a pair of lamp cases, and a fan base that form a housing structure.

In the pair of lamp cases, four lamp holders, in which lamps are housed, are respectively disposed. That is, two lamp holders are disposed in each of the pair of lamp cases. The pair of lamp cases is housed in the lamp fan base and configured to be capable of sliding independently from each other. Lamp-side ducts are respectively provided in the lamp holders.

The fan base is disposed on the outer side of the lamp fan base. Four blower fans and four fan-side ducts corresponding to the blower fans are placed on the fan base. The four blower fans are disposed to respectively correspond to the four lamp holders. The four fan-side ducts are configured to be capable of communicating with the lamp-side ducts of the respective four lamp holders. The fan base is coupled to the lamp fan base in an axial supporting section and configured to be capable of turning about the axial supporting section.

In the lamp unit, the lamp side ducts and the fan-side ducts are fit with each other in a position (an air blowing position) where the fan base is closest to the lamp case. The fan base is turned from the air blowing position. The lamp-side ducts and the fan-side ducts are unfitted in a position (a retracted position) where the fan base separates from the lamp case. That is, for example, in the lamp unit, when the lamp holder is replaced, the lamp case is slid after the fan base is retracted.

However, in the technique described in Patent Literature 1, a mechanism or an operation section for turning the fan base and a space for the turning need to be provided in a projector or the like on which the lamp unit is mounted. That is, in the technique described in Patent Literature 1, the structure around the fan base in the projector is limited and the projector is increased in size.

SUMMARY

An advantage of some aspects of the invention is to solve at least a part of the problems described above, and the invention can be implemented as the following forms or application examples.

Application Example 1

A lighting device according to this application example includes: a light source device unit including a light source; a supporting section configured to support the light source device unit to be capable of sliding from a first position to a second position, which is a predetermined position of the light source device unit, in a first direction; a cooling device including a cooling fan and an outflow section having formed therein an outflow port from which the air emitted from the cooling fan flows out; and a circulating device supported by the light source device unit or the outflow section and configured to circulate, in the second position, the air flowing out from the outflow port to the light source device unit. The light source device unit includes an inflow port opened in a direction along a second direction crossing the first direction and a channel that leads the air flowing in from the inflow port to the light source. The outflow port is opened to a side opposed to the inflow port of the light source device unit in the second position. The circulating device includes a moving section disposed between the light source device unit and the outflow section in the second position, a ventilation hole for causing the outflow port and the inflow port to communicate being formed in the moving section, and an urging section configured to urge, in the second direction, the moving section in a direction away from the light source device unit or the outflow section that supports the circulating device.

According to this configuration, the lighting device includes the light source device unit attached to and detached from the supporting section by being slid in the first direction and the circulating device supported by the light source device unit or the outflow section of the cooling device. The circulating device includes the moving section disposed between the light source device unit and the outflow section in the second position. In the moving section, in the second position, the ventilation hole for causing the outflow port of the cooling device and the inflow port of the light source device unit to communicate is formed. The outflow port, the ventilation hole, and the inflow port are opened in the direction along the second direction. That is, the lighting device is configured such that the direction of the air blown from the cooling device and a direction in which the light source device unit is slid to be attached and detached cross. The circulating device includes the urging section configured to urge the moving section. Consequently, when the light source device unit is slid from the first position to the second position, it is possible to bring the moving section into contact with the outflow section or the light source device unit and reduce a gap between the moving section and the light source device unit or between the moving section and the outflow section. That is, in a configuration in which the circulating device is not provided, in order to enable the light source device unit to slide, a clearance needs to be provided between the light source device unit and a part in which the light source device unit is housed. Therefore, a gap is easily formed between the outflow port and the inflow port. However, according to the configuration of this application example, it is possible to suppress the gap. Accordingly, it is possible to suppress a leak of the air blown from the cooling device and blow the air to the light source device unit. Therefore, it is possible to provide the lighting device having a configuration in which the direction in which the light source device unit is slid to be attached and detached and the direction of the air blown from the cooling device are crossing directions, the lighting device being capable of cooling the light source effectively using the air blown by the cooling device.

The moving section moves when the light source device unit is slid. Therefore, it is unnecessary to provide a mechanism or an operation section for moving the moving section into an apparatus such as a projector on which the lighting device is mounted. The moving section does not project to the outer side of the lighting device. It is possible to achieve the effects explained above even if a moving amount is small. Accordingly, it is possible to provide the lighting device with an increase in the size of the apparatus suppressed without limiting the structure around the lighting device in the apparatus.

Application Example 2

In the lighting device according to the application example, it is preferable that the circulating device further includes an annular elastic member, the elastic member is disposed between the light source device unit or the outflow section, which supports the circulating device, and the moving section, an end portion on one side of the elastic member surround the peripheral edge of the ventilation hole and an end portion on the other side of the elastic member surrounds the peripheral edge of the inflow port or the peripheral edge of the outflow port.

According to this configuration, the circulating device includes the annular elastic member. When the circulating device is supported by the light source device unit, the elastic member is disposed between the light source device unit and the moving section and surrounds the peripheral edge of the inflow port and the peripheral edge of the ventilation hole. When the circulating device is supported by the outflow section, the elastic member is disposed between the outflow section and the moving section and surrounds the peripheral edge of the outflow port and the peripheral edge of the ventilation hole. Consequently, it is possible to further suppress the gap between the outflow port and the inflow port. Therefore, it is possible to cool the light source more effectively using the air blown by the cooling device.

Application Example 3

In the lighting device according to the application example, it is preferable that the circulating device is supported by the light source device unit, the outflow section includes an outflow surface opposed to the moving section in the second position, the outflow port is formed on the outflow surface, and the outflow surface inclines with respect to the first direction to further project to the light source device unit side as an opposed position of the outflow surface and the moving section is further on the depth side when the light source device unit is slid from the first position toward the second position.

According to this configuration, the circulating device is supported by the light source device unit and the outflow surface of the outflow section inclines as explained above. Consequently, when the light source device unit is slid from the first position toward the second position, the moving section can come into contact with the outflow surface halfway and reach the second position with a gradually increasing urging force by the urging section. Accordingly, even in the configuration in which the circulating device is supported by the light source device unit, the moving section can be smoothly moved. Therefore, it is possible to smoothly slide the light source device unit from the first position to the second position and reduce the gap between the outflow port and the inflow port.

Application Example 4

In the lighting device according to the application example, it is preferable that the circulating device is supported by the outflow section, the moving section includes a plane opposed to the light source device unit, the ventilation hole is formed on the plane, and the plane inclines with respect to the first direction to further project to the light source device unit side as an opposed position of the plane and the light source device unit is further on the depth side when the light source device unit is slid from the first position toward the second position.

According to this configuration, the circulating device is supported by the outflow section and the plane of the moving section inclines as explained above. Consequently, when the light source device unit is slid from the first position toward the second position, the light source device unit can come into contact with the plane halfway and reach the second position with a gradually increasing urging force by the urging section. Accordingly, even in the configuration in which the circulating device is supported by the outflow section, the moving section can be smoothly moved. Therefore, it is possible to smoothly slide the light source device unit and reduce the gap between the outflow port and the inflow port.

Application Example 5

In the lighting device according to the application example, it is preferable that the light source device unit is configured to be detachable from the supporting section in the first position and includes: a light source device including the light source and a light source housing that houses the light source and includes the channel; and a holding section that holds the light source device and includes the inflow port.

According to this configuration, a component for enabling the holding section to slide with respect to the supporting section can be provided in the holding section. Therefore, it is possible to form the light source housing without increasing strength more than necessary and with a complicated shape suppressed.

Application Example 6

In the lighting device according to the application example, it is preferable that the holding section holds the light source device such that the optical axis of the light source extends along the second direction.

According to this configuration, it is possible to provide the lighting device including the light source device unit that emits light along the second direction and is capable of sliding in the first direction.

Application Example 7

In the lighting device according to the application example, it is preferable that the light source device unit includes a plurality of the light source devices, the plurality of light source devices emit lights to the same side and are held by the holding section along the first direction when viewed from a third direction crossing the first direction and the second direction, a plurality of the inflow ports are provided to correspond to the channels of the respective plurality of light source devices, and a plurality of the ventilation holes and a plurality of the outflow ports are provided to respectively correspond to the plurality of inflow ports.

According to this configuration, since the lighting device includes the plurality of light source devices, it is possible to emit brighter light. Since the plurality of inflow ports, the plurality of ventilation holes, and the plurality of outflow ports are provided to correspond to the channels of the respective plurality of light source devices, it is possible to blow the air to the plurality of light source devices in the same manner and cool the light sources in the same manner.

Application Example 8

In the lighting device according to the application example, it is preferable that the plurality of outflow ports are disposed to at least partially overlap in the third direction when viewed from the first direction.

According to this configuration, since the plurality of outflow ports are disposed to at least partially overlap as explained above, it is possible to blow the air to the respective plurality of light source devices in the same manner according to disposition positions in the third direction of the plurality of light source devices.

In the configuration in which the circulating device is not provided, when the plurality of outflow ports are disposed not to overlap in the third direction, it is possible to suppress a leak of apart of the air by providing a projecting section in a part of the peripheral edge of the outflow port and providing, on the light source device unit side, a part overlapping the projecting section. However, when the plurality of outflow ports are disposed to overlap as explained above, a region where the projecting section can be formed is reduced to prevent the projecting section from interfering with the light source device unit when the light source device unit slides. On the other hand, since the lighting device in this application example includes the circulating device, it is possible to suppress a leak of the air without the necessity of providing the projecting section at the peripheral edge of the outflow port. Accordingly, it is possible to provide the lighting device that can increase a degree of freedom of disposition of the plurality of outflow ports, that is, a degree of freedom of disposition positions of the plurality of light source devices and cool the light sources effectively using the air blown by the cooling device.

Application Example 9

In the lighting device according to the application example, it is preferable that the lighting device further includes a reflecting section configured to reflect light emitted from the light source device unit.

According to this configuration, since the lighting device includes the reflecting section, it is possible to change the direction of the light emitted from the light source device unit and emit the light to the outside of the lighting device.

Application Example 10

A projector according to this application example includes: the lighting device according to the application example; a light modulating device configured to modulate light emitted from the lighting device; and a projection optical device configured to project the light modulated by the light modulating device.

According to this application example, since the projector includes the lighting device, the projector has a configuration in which the direction of the air blown from the cooling device and a direction in which the light source device unit is attached and detached are crossing directions. Further, since deterioration of the light source is suppressed, it is possible to project an image for a long period.

Application Example 11

A light-source-device supporting instrument according to this application example is a light-source-device supporting instrument to which a light source device is attached, the light-source-device supporting instrument including: a holding section configured to hold the light source device; and a circulating device supported by the holding section. The holding section includes an engaging section with which the light-source-device supporting instrument is engaged to be capable of sliding along a first direction and an inflow port opened in a direction along a second direction crossing the first direction. The circulating device includes: a moving section disposed on the opposite side of the light source device in the holding section, a ventilation hole communicating with the inflow port being formed in the moving section; and an urging section configured to urge, in the second direction, the moving section in a direction away from the holding section.

According to this configuration, it is possible to provide the light-source-device supporting instrument capable of being attached to and detached from an apparatus such as a projector by being slid in a state in which the light-source-device supporting instrument holds the light source device. It is possible to provide the light-source-device supporting instrument that circulates, to the light source device, the air blown from a direction crossing a direction in which the light-source-device supporting instrument is attached and detached.

Since the light-source-device supporting instrument includes the circulating device, it is possible to cause the air blown from a cooling device in the apparatus to flow into the light source device via the ventilation hole of the moving section and the inflow port of the holding section. Since the moving section is urged by the urging section as explained above, it is possible to surely bring a part in which the light-source-device supporting instrument holding the light source device is housed in the apparatus and the moving section into contact with each other and reduce a gap between the moving section and the holding section.

Therefore, it is possible to provide the light-source-device supporting instrument that holds the light source device, is attached and detached in a direction crossing the direction of the air blown from the cooling device in the apparatus, and suppresses a leak of the air blown from the cooling device and circulates the air to the light source device.

Application Example 12

A light source cartridge according to this application example includes: the light-source-device supporting instrument according to the application example; and a channel forming section provided on the opposite side of the moving section in the holding section and including a channel communicating with the inflow port.

According to this configuration, since the light source cartridge includes the light-source-device supporting instrument and the channel forming section, easy attachment and detachment of the light source cartridge to an apparatus such as a projector is possible. Further, it is possible to efficiently circulate, via the channel of the channel forming section, the air blown from the direction crossing the attaching and detaching direction into the light source device attached to the light source cartridge to cool the light source.

BRIEF DESCRIPTION OF THE DRAWINGS

The invention will be described with reference to the accompanying drawings, wherein like numbers reference like elements.

FIGS. 9A to 9C are diagrams for explaining a holding section and a circulating device in the embodiment.

DESCRIPTION OF EXEMPLARY EMBODIMENTS

A projector according to an embodiment is explained with reference to the drawings.

The projector in this embodiment modulates, according to image information, light emitted from a light source and enlarges and projects the modulated light on a projection surface such as a screen. The projector is configured to be capable of taking a laterally placed posture in which the projector is placed on a desk or the like and projects a laterally long image on the projection surface and a longitudinally placed posture in which the projector is rotated 90° from the laterally placed posture when viewed from a side opposed to the projection surface and projects a longitudinally long image on the projection surface.

Main Configuration of the Projector

Figure 1:
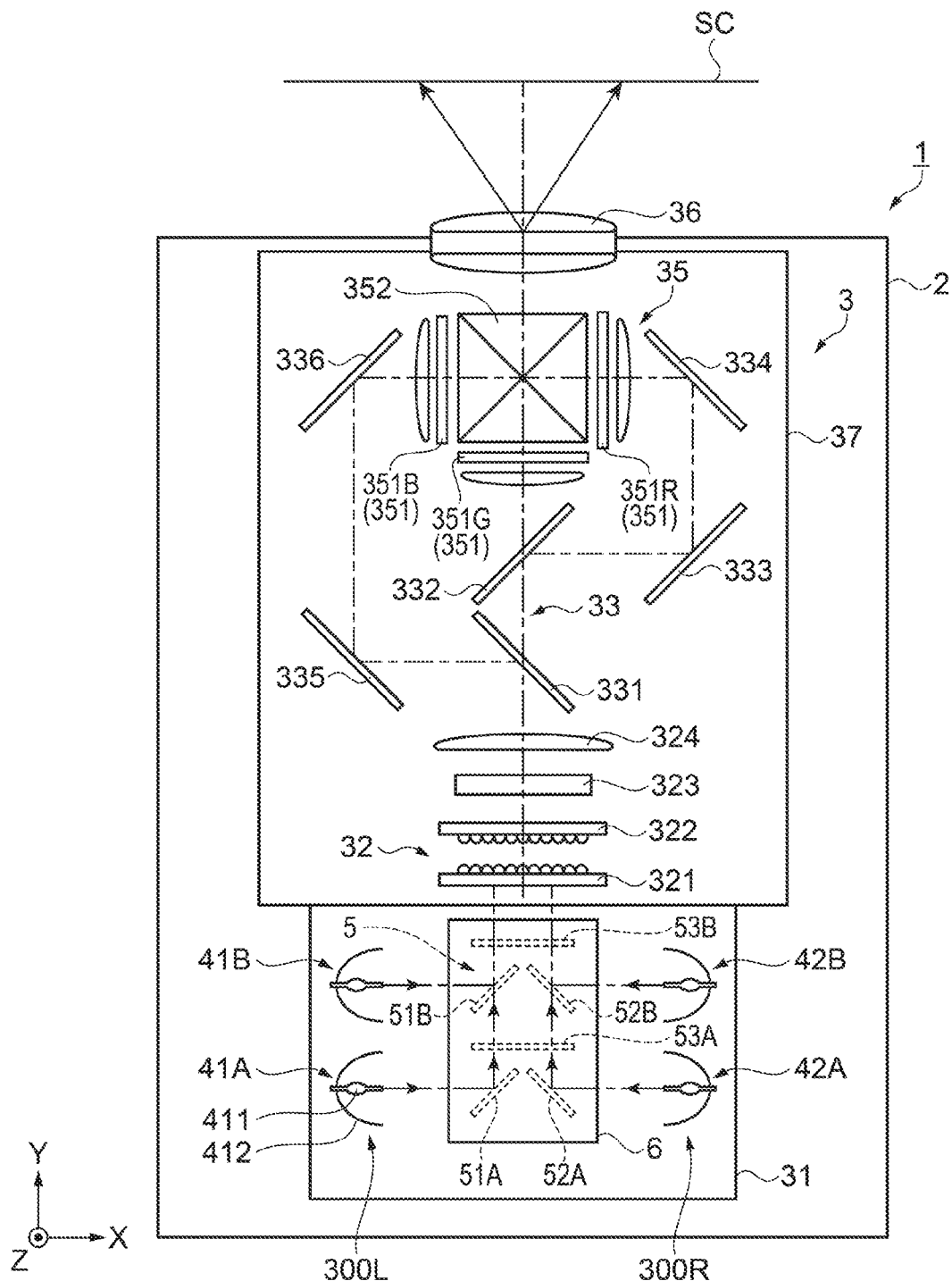
FIG. 1 is a schematic diagram showing the schematic configuration of a projector in an embodiment.

FIG. 1 is a schematic diagram showing the schematic configuration of a projector 1 in this embodiment.

The projector 1 includes, as shown in FIG. 1, an exterior housing 2 configuring an exterior, a control section (not shown in the figure), and an optical unit 3 including a lighting device 31. Note that, although not shown in the figure, a power supply device that supplies electric power to the lighting device 31, the control section, and the like, an air intake fan and an exhaust fan for cooling the inside of the exterior housing 2, a member that leads the air, and the like are further disposed on the inside of the exterior housing 2. In the following explanation, for convenience of explanation, in the projector 1 in the laterally placed posture, a projection surface SC side is described as +Y side (front side), the right side viewed from a side opposed to the projection surface SC is described as +X side, and the upper side in the vertical direction is described as +Z side.

Although not explained in detail, the exterior housing 2 is configured by a plurality of members. An air intake port for taking in the outdoor air, an exhaust port for exhausting the warmed air inside the exterior housing 2 to the outside, and the like are provided in the exterior housing 2.

The control section includes a circuit board mounted with circuit elements such as a CPU (Central Processing Unit), a ROM (Read Only Memory), and a RAM (Random Access Memory) and functions as a computer. The control section performs control of the operation of the projector 1, for example, control related to projection of an image and control of driving and the like of various fans.

Configuration of the Optical Unit

The optical unit 3 optically processes light emitted from the lighting device 31 and projects the light under the control by the control section.

The optical unit 3 includes, as shown in FIG. 1, in addition to the lighting device 31, an integrator illumination optical system 32, a color separation optical system 33, an optical device 35, a projection lens 36 functioning as a projection optical device, and an optical component housing 37 in which the optical components 31 to 36 are disposed in predetermined positions on an optical path.

Figure 2:
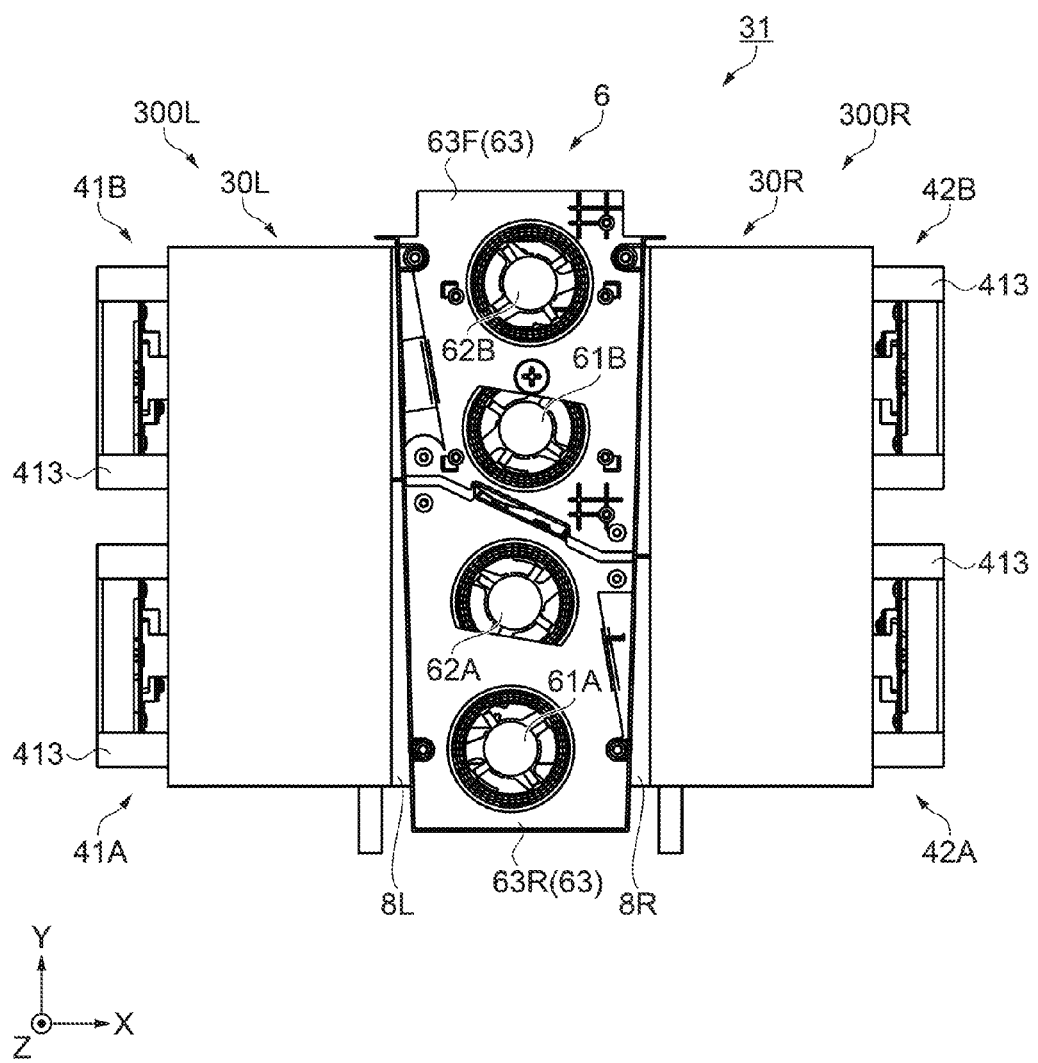
FIG. 2 is a plan view of a lighting device in the embodiment viewed from above.
Figure 3:
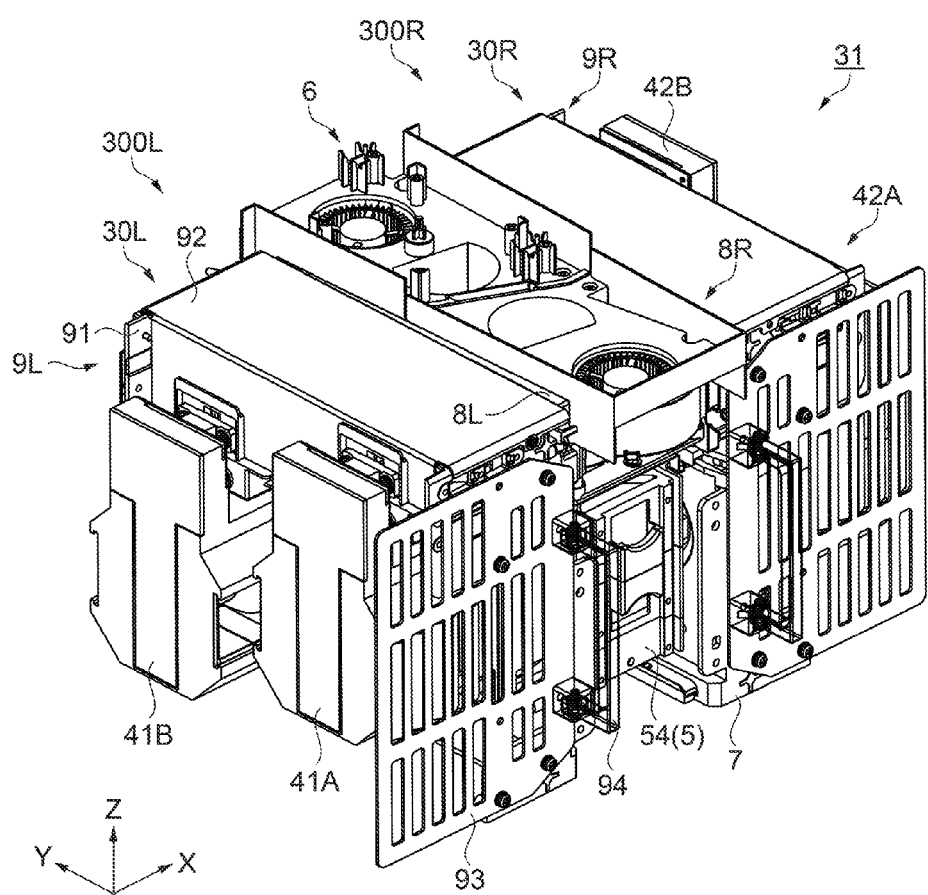
FIG. 3 is a perspective view of the lighting device in the embodiment.

FIG. 2 is a plan view of the lighting device 31 viewed from above. FIG. 3 is a perspective view of the lighting device 31. Note that FIGS. 2 and 3 are diagrams in which a circuit board 64 (see FIG. 8) explained below of a cooling device 6 is not shown.

As explained in detail below, the lighting device 31 includes, as shown in FIGS. 2 and 3, light source attaching/detaching units 300L and 300R, a reflecting section 5, the cooling device 6, and a supporting section 7.

The light source attaching/detaching units 300L and 300R respectively include pluralities of light source devices. The light source attaching/detaching units 300L and 300R are disposed to be opposed to each other via the reflecting section 5 and configured to be detachably attachable to the supporting section 7.

The reflecting section 5 reflects lights emitted from the respective light source attaching/detaching units 300L and 300R toward the integrator illumination optical system 32.

The cooling device 6 includes a plurality of cooling fans and cools light source devices in the light source attaching/detaching units 300L and 300R.

The supporting section 7 is fixed to the optical component housing 37, holds the reflecting section 5 and the cooling device 6, and supports the respective light source attaching/detaching units 300L and 300R to be capable of sliding in a Y direction. The supporting section 7 supports the light-source attaching/detaching units 300L and 300R to be capable of sliding, in the Y direction, from a first position where the respective light source attaching/detaching units 300L and 300R are placed on the supporting section 7 to a second position where the light source attaching/detaching units 300L and 300R are respectively in predetermined positions. The light source attaching/detaching units 300L and 300R are slid in a −Y direction, that is, the rear side of the projector 1 from the second position and detached from the supporting section 7 in the first position. The Y direction is equivalent to the first direction. An X direction is equivalent to the second direction. A Z direction is equivalent to the third direction.

Referring back to FIG. 1, the integrator illumination optical system 32 includes a first lens array 321, a second lens array 322, a polarization conversion element 323, and a superimposition lens 324.

The first lens array 321 has a configuration in which small lenses are arrayed in a matrix shape. The first lens array 321 divides light emitted from the lighting device 31 into a plurality of partial lights. The second lens array 322 has a configuration substantially the same as the configuration of the first lens array 321. The second lens array 322 substantially superimposes, in conjunction with the superimposition lens 324, the partial lights on the surface of a liquid crystal panel explained below. The polarization conversion element 323 has a function of aligning random lights emitted from the second lens array 322 as substantially one kind of polarized light usable on the liquid crystal panel.

The color separation optical system 33 includes two dichroic mirrors 331 and 332 and reflection mirrors 333 to 336. The color separation optical system 33 separates light emitted from the integrator illumination optical system 32 into color lights of three colors, that is, red light (hereinafter referred to as "R light"), green light (hereinafter referred to as "G light"), and blue light (hereinafter referred to as "B light") and leads the color lights to the optical device 35.

The optical device 35 includes light modulating devices 351 provided for the color lights (the light modulating device for the R light is represented as 351R, the light modulating device for the G light is represented as 351G, and the light modulating device for the B light is represented as 351B) and a cross dichroic prism 352 functioning as a color combination optical device.

The light modulating devices 351 include liquid crystal panels of a transmission type, incident side polarizing plates disposed on light incident sides of the liquid crystal panels, and emission side polarizing plates disposed on light emission sides of the liquid crystal panels. The light modulating devices 351 modulate the color lights according to image information.

The cross dichroic prism 352 is formed in a substantially square shape in plan view obtained by sticking together four right-angle prisms. Two dielectric multilayer films are formed on an interface between the stuck right-angle prisms. In the cross dichroic prism 352, the dielectric multilayer films reflect the R light and the B light modulated by the light modulating devices 351R and 351B, transmit the G light modulated by the light modulating device 351G, and combine modulated lights of the three colors.

The projection lens 36 includes a plurality of lenses (not shown in the figure). The projection lens 36 enlarges and projects light combined by the cross dichroic prism 352 on the projection surface SC.

Configuration of the Lighting Device

The lighting device 31 is explained in detail.

Figure 4:
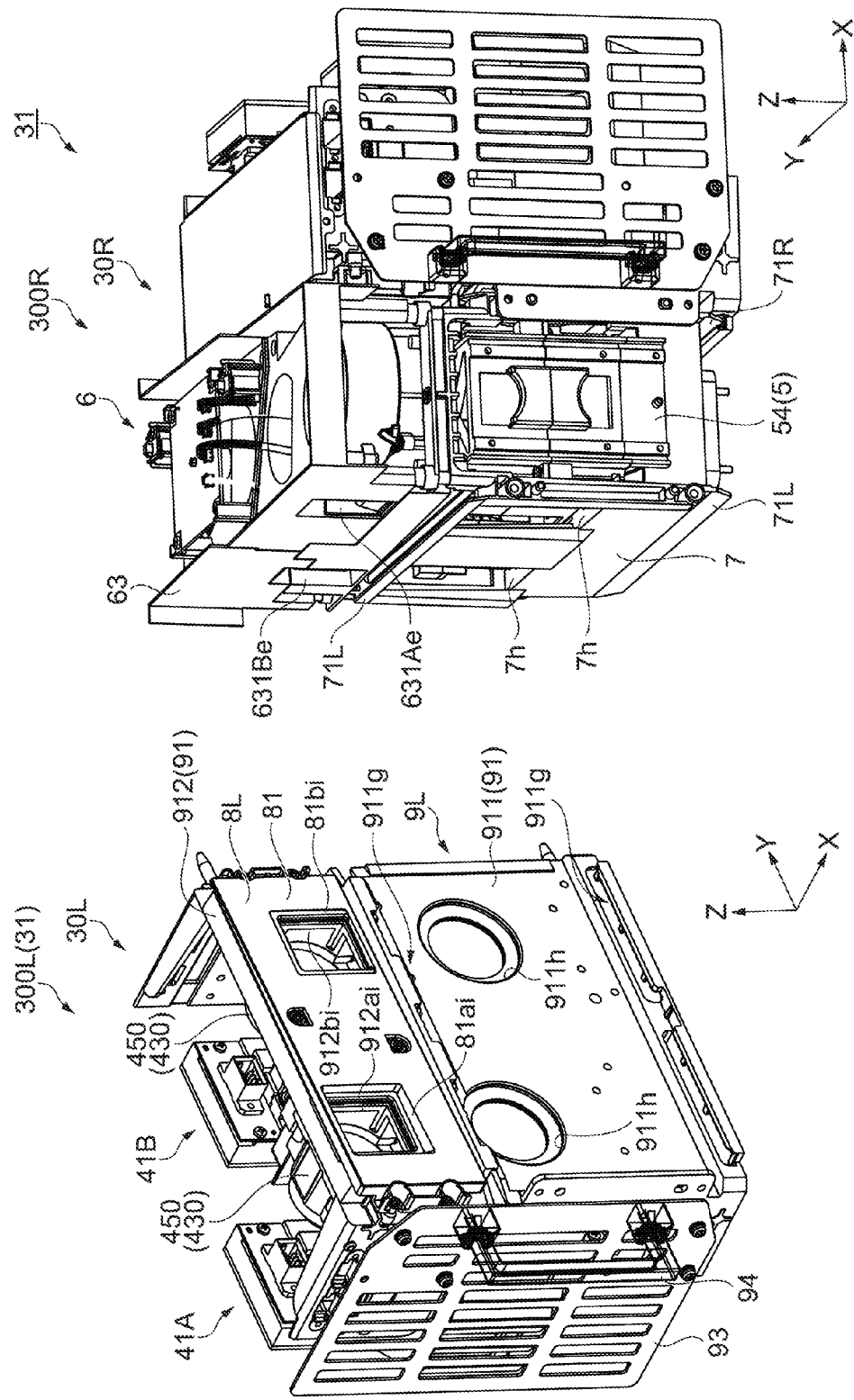
FIGS. 4A and 4B are diagrams for explaining the lighting device in the embodiment.

FIGS. 4A and 4B are diagrams for explaining the lighting device 31. FIG. 4A is a perspective view of the light source attaching/detaching unit 300L. FIG. 4B is a perspective view of the lighting device 31 in a state in which the light source attaching/detaching unit 300L is detached. Note that FIG. 4A is a diagram of a state in which a cover section 92 (see FIG. 3) of a holding section 9L explained below is detached.

As explained above and as shown in FIG. 3 and FIGS. 4A and 4B, the lighting device 31 includes the light source attaching/detaching units 300L and 300R, the reflecting section 5, the cooling device 6, and the supporting section 7.

The light source attaching/detaching unit 300L includes alight source device unit 30L and a circulating device 8L. The light source attaching/detaching unit 300L is disposed on a −X side of the supporting section 7. The light source attaching/detaching unit 300R includes a light source device unit 30R and a circulating device 8R. The light source attaching/detaching unit 300R is disposed on the +X side of the supporting section 7.

The light source device unit 30L includes, as shown in FIG. 3, light source devices 41A and 41B and the holding section 9L that holds the light source devices 41A and 41B. The light source device unit 30R includes light source devices 42A and 42B and a holding section 9R that holds the light source devices 42A and 42B. That is, the light source device unit 30L is supported by the supporting section 7 via the holding section 9L. The light source device unit 30R is supported by the supporting section 7 via the holding section 9R.

Figure 5:
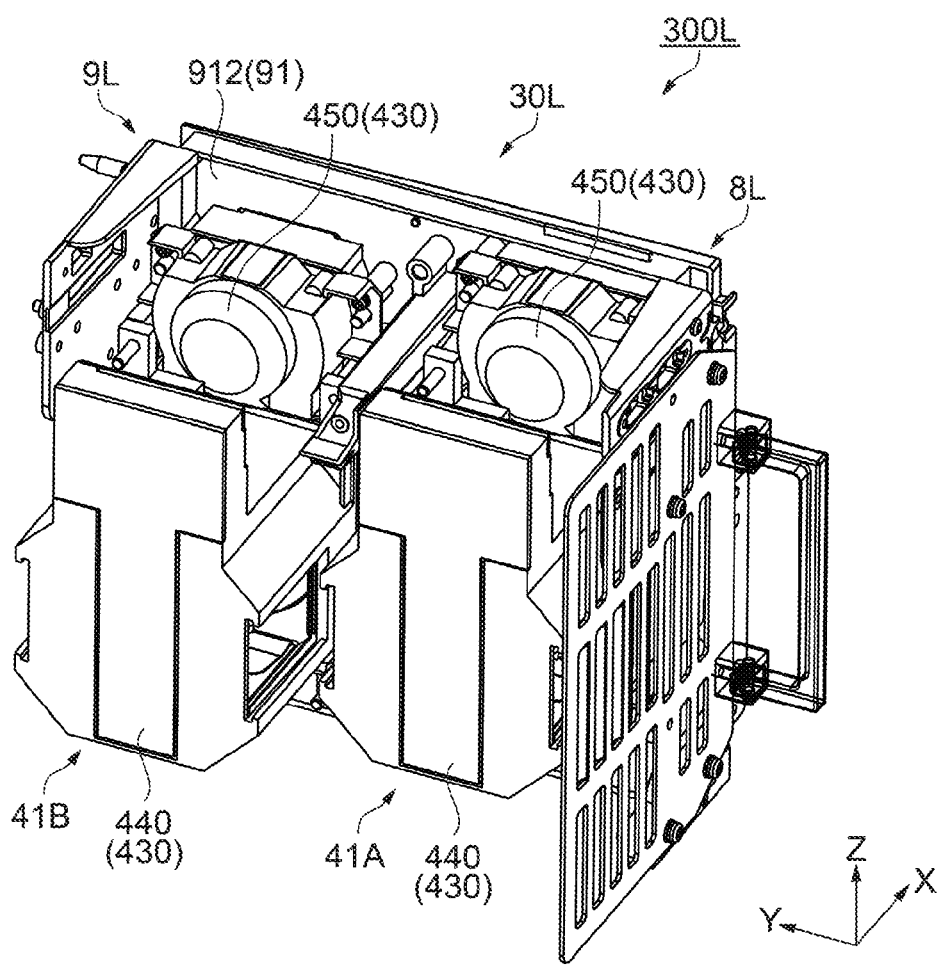
FIG. 5 is a perspective view showing a light-source attaching/detaching unit in the embodiment.
Figure 6:
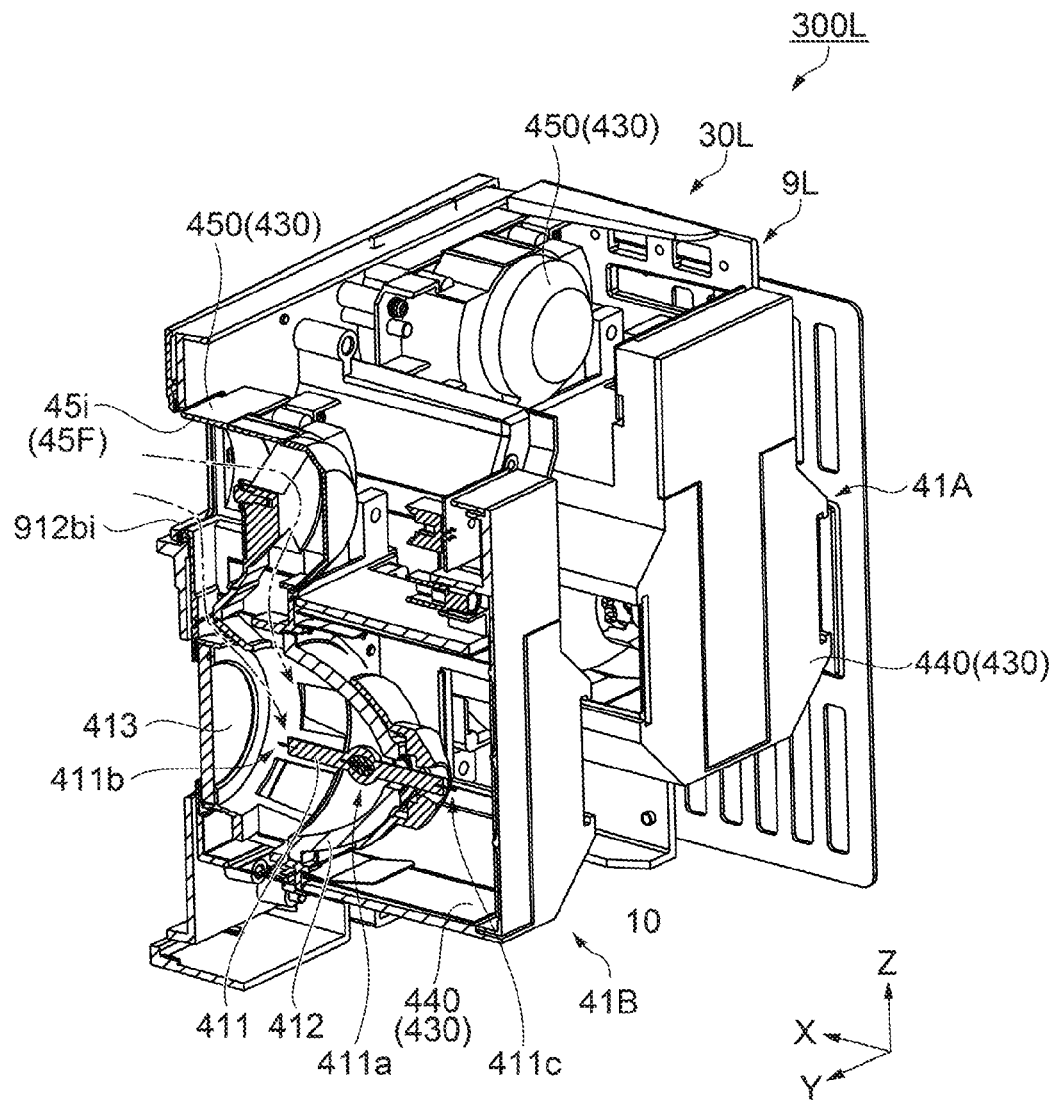
FIG. 6 is a sectional perspective view of the light-source attaching/detaching unit in the embodiment.

FIG. 5 is a perspective view showing the light source attaching/detaching unit 300L and is a diagram of the light source attaching/detaching unit 300L viewed obliquely from the −X direction. FIG. 6 is a sectional perspective view of the light source attaching/detaching unit 300L. Note that FIGS. 5 and 6 are diagrams of a state in which the cover section 92 of the holding section 9L is detached.

Each of the light source devices 41A, 41B, 42A, and 42B includes, as shown in FIGS. 1, 5, and 6, a light source 411 of a discharge type including an ultra-high pressure mercury lamp or a metal halide lamp, a reflector 412, a collimating lens 413, and a light source housing 430. The light source device reflects, with the reflector 412, light emitted from the light source 411, aligns an emitting direction of the light, and emits the light.

The light source 411 includes, as shown in FIG. 6, a luminous tube 411a including a spherical light emitting section and a pair of sealing sections extending from both sides of the light emitting section and a pair of electrodes 411b and 411c projecting from the pair of sealing sections. The light source 411 is fixed to the reflector 412 such that the electrode 411b is located on the inner side of the reflector 412. The light source 411 emits light when electric power is supplied to the pair of electrodes 411b and 411c.

The light source housing 430 includes, as shown in FIGS. 5 and 6, a housing main body section 440 and a channel forming section 450 located on the upper side (the +Z side) of the housing main body section 440.

As shown in FIG. 6, the housing main body section 440 houses the light source 411 and the reflector 412. In the channel forming section 450, a channel 45F for leading the air blown from the cooling device 6 to the light source 411 in the housing main body section 440 is formed. The channel 45F includes an inlet 45i opened to the +X side. The air flows into the inlet 45i.

A positional relation among the light source devices 41A, 41B, 42A, and 42B is explained.

Referring back to FIG. 1, the light source device 41A and the light source device 42A are disposed to emit lights to directions opposed to each other in the X direction. Specifically, the light source device 41A emits light to the +X direction. The light source device 42A emits light to the −X direction.

The light source device 41B and the light source device 42B are respectively disposed on the +Y sides of the light source device 41A and the light source device 42A. Like the light source device 41A and the light source device 42A, the light source device 41B and the light source device 42B emit lights to directions opposed to each other in the X direction.

As the four light source devices (the light source devices 41A, 41B, 42A, and 42B), two light source devices opposed to each other and two light sources provided in parallel in the Y direction are disposed to be shifted from each other in the Z direction.

Figure 7A:
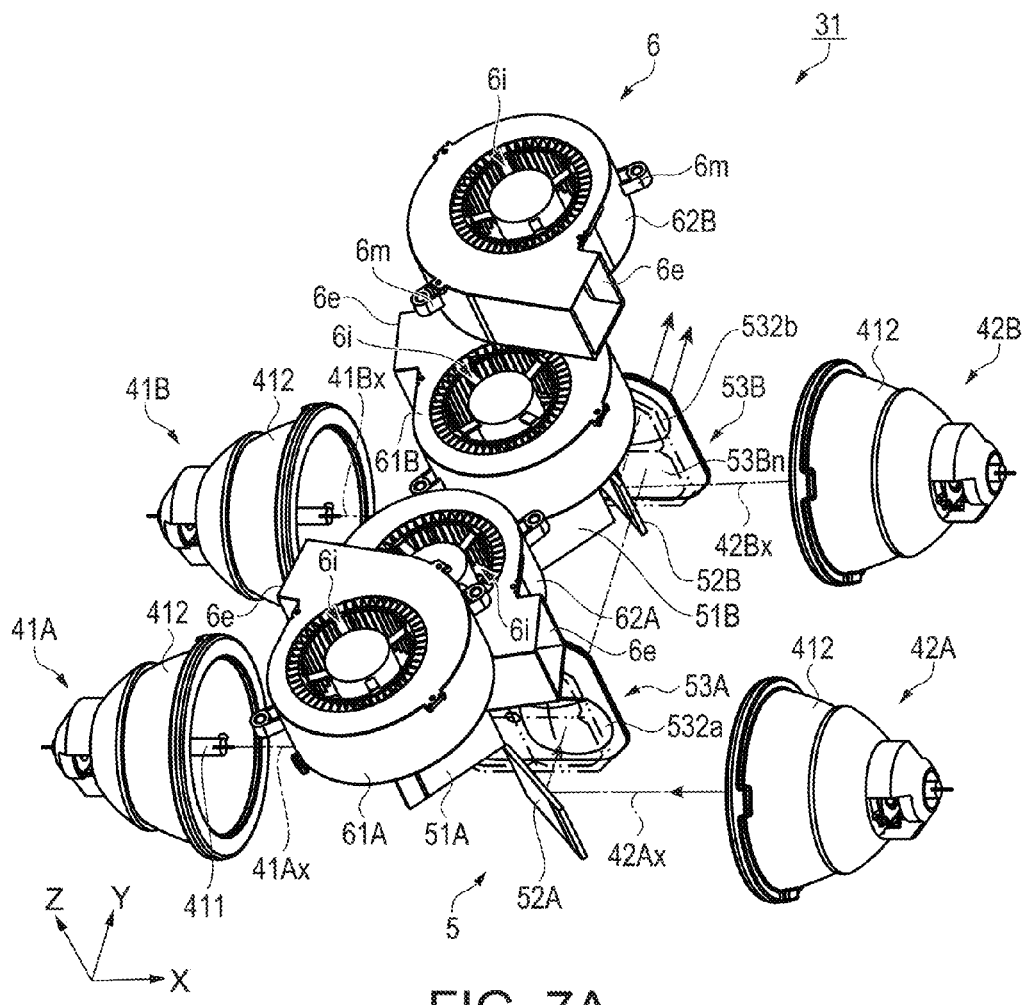
FIGS. 7A and 7B are diagrams for explaining a positional relation of a light source device in the embodiment.
Figure 7B:
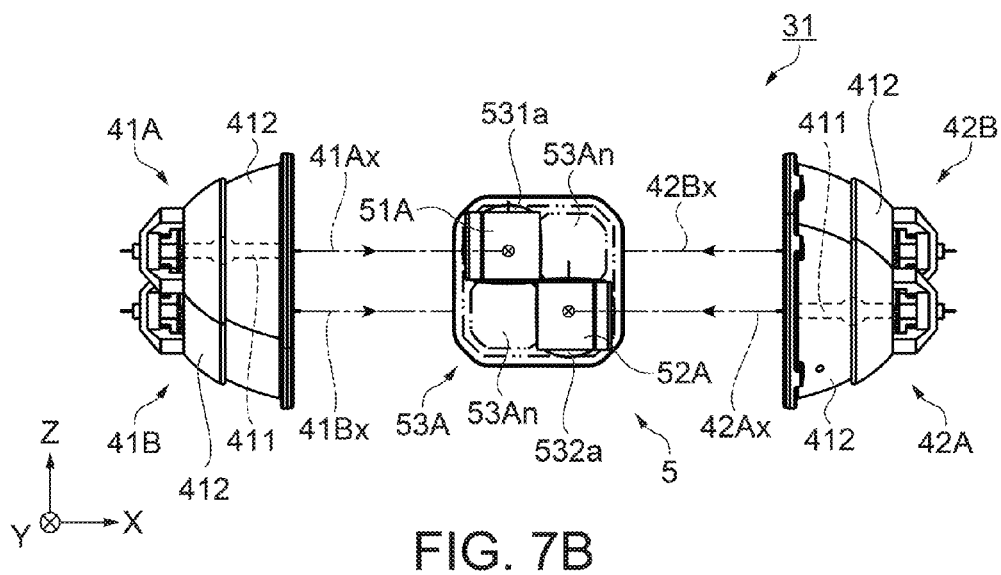

FIGS. 7A and 7B are diagrams for explaining the positional relation among the light source devices 41A, 41B, 42A, and 42B. Specifically, FIG. 7A is a perspective view showing the reflectors 412 of the respective light source devices 41A, 41B, 42A, and 42B, the reflecting section 5, and cooling fans 61A, 61B, 62A, and 62B in the cooling device 6. FIG. 7B is a plan view of the reflectors 412 and the reflecting section 5 viewed from the −Y side.

As shown in FIGS. 7A and 7B, the light source device 41A and the light source device 42A are disposed such that an optical axis 41Ax of the light source device 41A is located above an optical axis 42Ax of the light source device 42A. The light source device 41B and the light source device 42B are disposed such that an optical axis 41Bx of the light source device 41B is located below an optical axis 42Bx of the light source device 42B. In the up-down direction (the Z direction), the light source device 41B is disposed in a position substantially the same as the position of the light source device 42A and the light source device 42B is disposed in a position substantially the same as the position of the light source device 41A.

In this way, the light source devices 41A and 41B emit lights to the same side (the +X side). The light source devices 41A and 41B are held by the holding section 9L such that the optical axes 41Ax and 41Bx extend along the X direction (the second direction). The light source devices 41A and 41B are held by the holding section 9L along the Y direction (the first direction) when viewed from the Z direction (the third direction).

The light source devices 42A and 42B emit lights in the same side (the −X side). The light source devices 42A and 42B are held by the holding section 9R such that the optical axes 42Ax and 42Bx extend along the X direction (the second direction). The light source devices 42A and 42B are held by the holding section 9R along the Y direction (the first direction) when viewed from the Z direction (the third direction).

As shown in FIG. 4A, the circulating device 8L includes a moving section 81 and is supported by the holding section 9L. In the circulating device 8L, the moving section 81 is disposed between the light source device unit 30L and the cooling device 6 in a state in which the light source attaching/detaching unit 300L is positioned in the second position. The circulating device 8L circulates the air blown from the cooling device 6 to the light source devices 41A and 41B. Similarly, the circulating device 8R includes the moving section 81 and is supported by the holding section 9R. In the circulating device 8R, the moving section 81 is disposed between the light source device unit 30R and the cooling device 6 in a state in which the light source attaching/detaching unit 300R is positioned in the second position. The circulating device 8R circulates the air blown from the cooling device 6 to the light source devices 42A and 42B. The holding sections 9L and 9R and the circulating devices 8L and 8R are explained in detail below.

The reflecting section 5 includes, as shown in FIG. 1 and FIGS. 7A and 7B, reflection mirrors 51A, 51B, 52A, and 52B, lens bodies 53A and 53B, and a housing member 54 (see FIG. 3) that houses these members.

The reflection mirrors 51A and 52A are disposed between the light source device 41A and the light source device 42A. The reflection mirrors 51A and 52A correspond to the positions of the light source devices 41A and 42A. The reflection mirror 51A is disposed above the reflection mirror 52A. The respective reflection mirrors 51A and 52A reflect lights emitted from the light source devices 41A and 42A to the +Y direction.

The reflection mirrors 51B and 52B are disposed between the light source device 41B and the light source device 42B. The reflection mirrors 51B and 52B correspond to the positions of the light source devices 41B and 42B. The reflection mirror 51B is disposed below the reflection mirror 52B. The respective reflection mirrors 51B and 52B reflect lights emitted from the light source devices 41B and 42B to the +Y direction.

The lens body 53A has a function of aligning traveling directions of the lights reflected by the reflection mirrors 51A and 52A. The lens body 53B has a function of aligning traveling directions of the lights reflected by the reflection mirrors 51B and 52B.

As shown in FIGS. 7A and 7B, the lens body 53A has a shape obtained by cutting the four corners of a rectangular shape in plan view. Among upper, lower, left, and right divided four regions, a lens section 531$a$ is provided in an upper left region and a lens section 532$a$ is provided in a lower right region. The lens section 531$a$ is formed in a position on which the light reflected by the reflection mirror 51A is made incident. The lens section 532$a$ is formed in a position on which the light reflected by the reflection mirror 52A is made incident. Note that the lens body 53A includes non-lens sections 53An in a lower left region and an upper right region among the upper, lower, left, and right divided four regions.

Like the lens body 53A, the lens body 53B has a shape obtained by cutting the four corners in a rectangular shape in plan view. A lens section 531$b$ (not shown in the figure) is provided in a lower left region among upper, lower, left, and right divided four regions. A lens section 532$b$ is provided in an upper right region. The lens section 531$b$ is formed in a position on which the light reflected by the reflection mirror 51B is made incident. The lens section 532$b$ is formed in a position on which the light reflected by the reflection mirror 52B is made incident. Note that the lens body 53B includes non-lens sections 53Bn in an upper left region and a lower right region among the upper, lower, left, and right divided four regions.

Light emitted from the light source device 41A is reflected by the reflection mirror 51A and thereafter transmitted through the lens section 531$a$ and the non-lens section 53Bn of the lens body 53B and made incident on a region on an upper left side in plan view of the first lens array 321. Light emitted from the light source device 42A is reflected by the reflection mirror 52A and thereafter transmitted through the lens section 532$a$ and the non-lens section 53Bn of the lens body 53B and made incident on a region on a lower right side in plan view of the first lens array 321.

Light emitted from the light source device 41B is reflected by the reflection mirror 51B and thereafter transmitted through the lens section 531$b$ and made incident on a region on a lower left side in plan view of the first lens array 321. Light emitted from the light source device 42B is reflected by the reflection mirror 52B and thereafter transmitted through the lens section 532$b$ and made incident on a region on an upper right side in plan view of the first lens array 321.

In this way, the lights emitted from the light source devices 41A, 41B, 42A, and 42B are made incident on the respective upper, lower, left, and right divided four regions in plan view in the first lens array 321.

As shown in FIG. 4B, the external shape of the supporting section 7 is formed in a rectangular parallelepiped shape. The reflecting section 5 is disposed on the inside of the supporting section 7. The cooling device 6 is held on the upper side of the supporting section 7. As explained above, the supporting section 7 supports the respective light source attaching/detaching units 300L and 300R to be capable of sliding in the Y direction.

Holes 7h, through which the lights emitted from the light source devices 41A and 41B are transmitted, are formed on the surface on the −X side of the supporting section 7. Protrusion sections 71L extending along the Y direction are formed at the upper and lower end portions of the surface on the −X side of the supporting section 7.

Like the surface on the −X side, on the surface on the +X side of the supporting section 7, holes (not shown in the figure), through which the lights emitted from the light source devices 42A and 42B in the light source device unit 30R are transmitted, and protrusion sections 71R extending along the Y direction are formed.

As shown in FIG. 4B, the cooling device 6 is disposed above the reflecting section 5.

Figure 8:
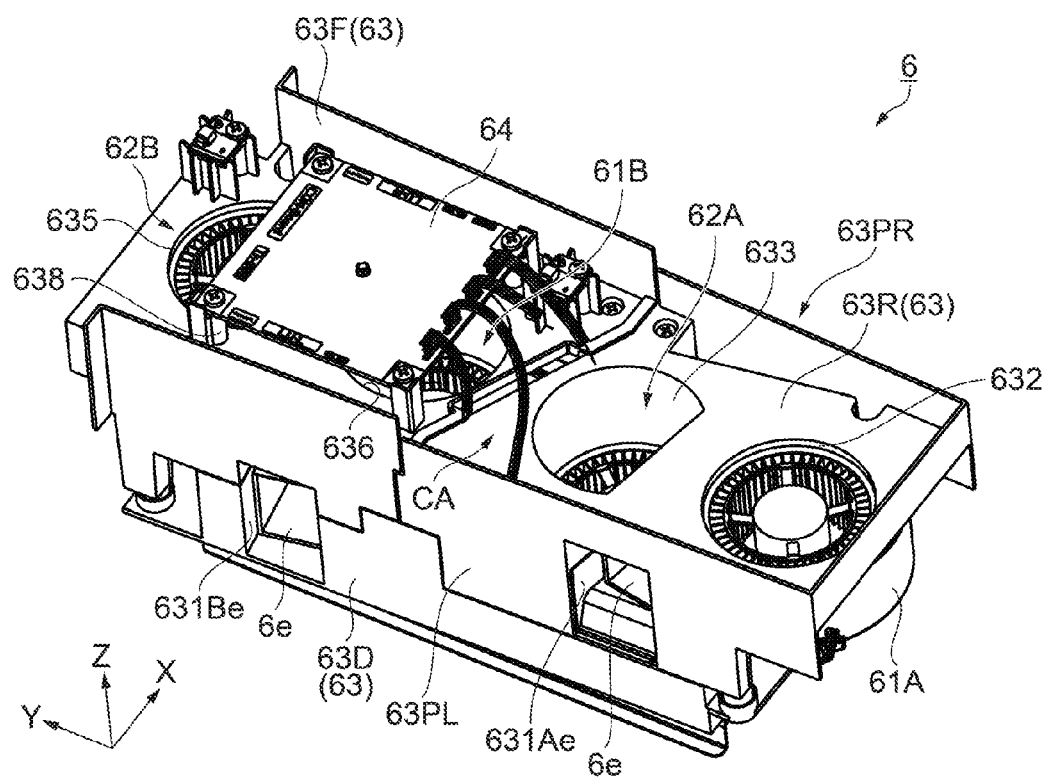
FIG. 8 is a perspective view of a cooling device in the embodiment.

FIG. 8 is a perspective view of the cooling device 6.

The cooling device 6 includes, as shown in FIG. 8, cooling fans 61A, 61B, 62A, and 62B, a fan housing section 63 functioning as an outflow section, and the circuit board 64. Although not shown in the figure, a light blocking plate, which blocks light traveling to the cooling device 6 among lights reflected by the reflecting section 5, is disposed on the lower surface of the fan housing section 63.

The cooling fans 61A, 61B, 62A, and 62B are sirocco fans that discharge cooling air taken in from a direction along a rotation center axis of a vane to a rotation tangential direction. As shown in FIG. 7A, the cooling fans 61A, 61B, 62A, and 62B are provided to respectively correspond to the light source devices 41A, 41B, 42A, and 42B. Specifically, the cooling fan 61A blows the cooling air to the light source device 41A. The cooling fan 61B blows the cooling air to the light source device 41B. The cooling fan 62A blows the cooling air to the light source device 42A. The cooling fan 62B blows the cooling air to the light source device 42B.

In the cooling fans 61A, 61B, 62A, and 62B, air intake ports 6i are located on the opposite side (the +Z side) of the reflecting section 5 and discharge ports 6e are disposed along the Y direction to respectively face the cooling target light source device sides. Specifically, the four cooling fans are disposed in the order of the cooling fan 61A, the cooling fan 62A, the cooling fan 61B, and the cooling fan 62B from the −Y side. In the cooling fans 61A and 61B, the discharge ports 6e are disposed to face the light source devices 41A and 41B sides. In the cooling fans 62A and 62B, the discharge ports 6e are disposed to face the light source devices 42A and 42B sides.

As shown in FIG. 7A, the cooling fan 61A is located above the cooling fan 62A in the same manner as the light source device 41A being located on the upper side with respect to the light source device 42A. The cooling fan 61A is disposed to overlap the outer side of the air intake port 6i of the cooling fan 62A.

The cooling fan 61B is located below the cooling fan 62B in the same manner as the light source device 41B being located on the lower side with respect to the light source device 42B. The cooling fan 61B is disposed such that the cooling fan 62B overlaps the outer side of the air intake port 6i.

The cooling fan 62A and the cooling fan 61B are disposed to be spaced apart in the Y direction. In the Z direction, the cooling fan 61A and the cooling fan 62B are disposed in substantially the same positions and the cooling fan 61B and the cooling fan 62A are disposed in substantially the same positions.

The fan housing section 63 includes, as shown in FIG. 8, a lower housing 63D, a front housing 63F, and a rear housing 63R. The lower housing 63D, the front housing 63F, and the rear housing 63R are combined to have a box shape and are formed to hold the cooling fans 61A, 61B, 62A, and 62B on the inside.

As shown in FIG. 8, the lower housing 63D forms the lower side of the fan housing section 63. The cooling fans 62A and 61B located on the lower side among the cooling fans 61A, 61B, 62A, and 62B are fixed to the lower housing 63D by screws.

The rear housing 63R forms the rear side (the −Y side) on the upper side of the fan housing section 63. The cooling fan 61A of the cooling fans 61A and 62B located on the upper side is fixed to the rear housing 63R by screws. On the upper surface of the rear housing 63R, an opening section 632 for opening the air intake port 6i of the cooling fan 61A and an opening section 633 for opening the air intake port 6i of the cooling fan 62A are formed.

The front housing 63F forms the front side (the +Y side) on the upper side of the fan housing section 63. The cooling fan 62B of the cooling fans 61A and 62B located on the upper side is fixed to the front housing 63F by screws. On the upper surface of the front housing 63F, an opening section 635 for opening the air intake port 6i of the cooling fan 62B and an opening section 636 for opening the air intake port 6i of the cooling fan 61B are formed.

In the fan housing section 63, as shown in FIG. 8, an outflow surface 63PL is formed on the −X side. The outflow surface 63PL is a plane opposed to the moving section 81 in the second position. On the outflow surface 63PL, an outflow port 631Ae, from which the air discharged from the cooling fan 61A flows out, and an outflow port 631Be, from which the air discharged from the cooling fan 61B flows out, are formed.

As shown in FIG. 4A, the outflow ports 631Ae and 631Be are formed to correspond to inflow ports 912ai and 912bi explained below provided in the light source device unit 30L. The outflow port 631Ae and the outflow port 631Be are disposed to at least partially overlap in the Z direction (the third direction) when viewed from the Y direction (the first direction). Specifically, the outflow ports 631Ae and 631Be are formed such that the outflow port 631Ae is located on the upper side of the outflow port 631Be in the Z direction and the lower side of the outflow port 631Ae and the upper side of the outflow port 631Be overlap when viewed from the Y direction.

The outflow surface 63PL inclines further to the −X side toward the +Y side. That is, the outflow surface 63PL inclines with respect to the Y direction (the first direction) to further project to the light source device unit 30L side as an opposed position of the outflow surface 63PL and the moving section 81 is further on the depth side when the light source device unit 30L is slid from the first position toward the second position.

Although not shown in the figure, an outflow surface 63PR is formed on the +X side of the fan housing section 63. Two outflow ports, from which the air discharged from the respective cooling fans 62A and 62B flows out, are formed on the outflow surface 63PR. The two outflow ports are disposed to at least partially overlap in the Z direction (the third direction) when viewed from the Y direction (the first direction). Specifically, the outflow ports are formed such that, in the Z direction, the upper side of the outflow port corresponding to the cooling fan 62A and the lower side of the outflow port corresponding to the cooling fan 62B overlap.

The outflow surface 63PR inclines further to the +X side toward the +Y side. That is, like the outflow surface 63PL, the outflow surface 63PR inclines with respect to the Y direction (the first direction) to further project to the light source device unit 30R side as an opposed position of the outflow surface 63PR and the moving section 81 is further on the depth side when the light source device unit 30R is slid from the first position toward the second position.

The circuit board 64 has a function of relaying electric connection of the cooling fans 61A, 61B, 62A, and 62B and the control section.

As shown in FIG. 8, the circuit board 64 is formed in a rectangular shape in plan view and fixed to a protrusion 638 formed on the upper surface of the front housing 63F by screws. Cables CA of the respective cooling fans 61A, 61B, 62A, and 62B are connected to the circuit board 64. A not-shown cable is connected to the circuit board of the control section from the circuit board 64. Note that, although the circuit board 64 is located above the opening sections 635 and 636, the circuit board 64 are disposed to be sufficiently spaced apart from the opening sections 635 and 636 not to hinder a cooling air intake ability of the cooling fans 61B and 62B.

Configurations of the Holding Sections and the Circulating Devices

The holding sections 9L and 9R and the circulating devices 8L and 8R are explained in detail. The holding section 9L and the circulating device 8L and the holding section 9R and the circulating device 8R are respectively equivalent to light-source-device supporting instruments. The light-source-device supporting instruments and the channel forming sections 450 attached to the light-source-device supporting instruments are equivalent to light source cartridges.

The light source attaching/detaching unit 300L and the light source attaching/detaching unit 300R are configured symmetrically. In the following explanation, the holding sections 9L and 9R and the circulating devices 8L and 8R are explained focusing on the holding section 9L and the circulating device 8L. Concerning the holding section 9R and the circulating device 8R, detailed explanation is omitted or simplified.

First, the holding section 9L is explained.

FIGS. 9A to 9C are diagrams for explaining the holding section 9L and the circulating device 8L. FIG. 9A is a perspective view showing the holding section 9L and the circulating device 8L separated from the holding section 9L. FIG. 9B is a partial perspective view of the vicinity of the −Y side end portion of the circulating device 8L supported by the holding section 9L. FIG. 9C is a partial perspective view of the vicinity of the +Y side end portion of the circulating device 8L supported by the holding section 9L.

The holding section 9L includes, as shown in FIGS. 4A, 5, and 9A to 9C, a holding main body section 91 that holds the light source devices 41A and 41B and the cover section 92 disposed on the upper side of the holding main body section 91. As shown in FIG. 5, the light source devices 41A and 41B are attached to the −X side of the holding main body section 91 using screws.

The holding main body section 91 includes, as shown in FIG. 9A, a base section 91X forming the lower side of the holding main body section 91 and an upper forming section 91Y provided on the upper side of the base section 91X.

The base section 91X includes a main-body attaching section 911 to which the housing main body sections 440 in the respective light source devices 41A and 41B are attached.

As shown in FIGS. 4A and 9A, the main-body attaching section 911 extends along a Y-Z plane. Holes 911h, through which lights emitted from the light source devices 41A and 41B respectively pass, are formed in the main-body attaching section 911.

In the main-body attaching section 911, guide grooves 911g are formed below and above the holes 911h. The guide grooves 911g are equivalent to engaging sections with which the holding section 9L are engaged to be capable of sliding along the Y direction (the first direction). The guide grooves 911g are formed along the Y direction and formed such that the protrusion sections 71L (see FIG. 4B) of the supporting section 7 are inserted. The light source attaching/detaching unit 300L is slid in the Y direction with the guide grooves 911g guided by the protrusion sections 71L. Specifically, the light source attaching/detaching unit 300L is placed on the supporting section 7 (the first position) such that the upper and lower protrusion sections 71L on the rear end side (the −Y side) of the supporting section 7 are inserted into the upper and lower guide grooves 911g on the distal end side (the +Y side) and is slid in the +Y direction and positioned in the second position.

The upper forming section 91Y includes, as shown in FIG. 9A, a circulation forming section 912, a rear forming section 913, and a front forming section 914.

The circulation forming section 912 is recessed to the −X side with respect to the main-body attaching section 911 and is formed in a long shape longer in the Y direction than the Z direction. In the circulation forming section 912, the channel forming sections 450 in the respective light source devices 41A and 41B are attached to the −X side and the circulating device 8L is attached to the +X side. When the light source devices 41A and 41B are replaced, the channel forming sections 450 are held by the circulation forming section 912. That is, the housing main body section 440 can be attached to and detached from the light source devices 41A and 41B in a state in which the channel forming sections 450 are attached to the holding section 9L.

The circulation forming section 912 includes a plane 912P extending along the Y-Z plane on the +X side. On the plane 912P, inflow ports 912ai and 912bi communicating with the channels 45F of the respective light source devices 41A and 41B are formed.

The inflow ports 912ai and 912bi are opened in the +X direction along the X direction (the second direction).

The outflow ports 631Ae and 631Be (see FIG. 4B) of the fan housing section 63 are opened to a side opposed to the inflow ports 912ai and 912bi in the second position.

The inflow port 912ai is formed to communicate with the channel 45F of the light source device 41A. The inflow port 912bi is formed to communicate with the channel 45F of the light source device 41B.

Note that, in order to prevent broken pieces from scattering to the outside of the light source devices 41A and 41B when the light source 411 is broken, mesh-like members may be disposed in the inlets 45i (see FIG. 6) of the channels 45F. Cross-shaped members Mh seen from the inflow ports 912ai and 912bi shown in FIG. 9A indicate frame members Mh for holding the not-shown mesh-like members. It goes without saying that the frame members Mh are unnecessary in a configuration in which the mesh-like members are not disposed.

The rear forming section 913 extends in the −X direction from the end portion on the rear side (the −Y side) of the circulation forming section 912. The rear forming section 913 is formed to be recessed more than the plane 912P on the +X side. In this recessed part, a columnar support pin 913s extending in the +X direction and a pair of guide shafts 913g disposed above and below the support pin 913s are formed.

The pair of guide shafts 913g has a shape in which two columnar shaft sections having different outer diameters are connected in the center axis direction as shown in FIG. 9B. Shaft sections on the distal end sides of the guide shafts 913g are formed smaller in outer diameter than shaft sections on the proximal end sides. Screw holes are formed in the centers of the guide shafts 913g.

Although not shown in detail in the figures, the front forming section 914 extends in the −X direction from the end portion on the front side (the +Y side) of the circulation forming section 912. The front forming section 914 is formed to be recessed more than the plane 912P on the +X side. In this recessed part, as shown in FIG. 9C, a support pin 914s and a pair of guide shafts 914g same as the support pin 913s and the pair of guide shafts 913g in the rear forming section 913 are provided.

Although not shown in the figure, in the front forming section 914, an input terminal for supplying electric power to the light source devices 41A and 41B is disposed.

As shown in FIG. 4A, a light blocking plate 93, which blocks leak lights from the light source devices 41A and 41B, and a gripping section 94 gripped by a user when the light source attaching/detaching unit 300L is attached and detached are attached to the holding main body section 91.

The circulating device 8L is explained.

The circulating device 8L includes, as shown in FIGS. 9A to 9C, the moving section 81, coil springs 82b and 82f functioning as urging sections, and elastic members 83A and 83B.

The moving section 81 is disposed on the +X side of the circulation forming section 912, that is, the opposite side of the light source devices 41A and 41B of the holding section 9L. Like the circulation forming section 912, the moving section 81 is formed in a long shape longer in the Y direction than the Z direction. The moving section 81 includes a plane 81P on the +X side. The moving section 81 is formed in a wedge shape, the thickness in the X direction of which decreases from the −Y side toward the +Y side. That is, like the outflow surface 63PL of the fan housing section 63, the plane 81P inclines with respect to the Y-Z plane. The moving section 81 in this embodiment is formed such that the plane 81P is substantially parallel to the outflow surface 63PL in the first position.

In the moving section 81, ventilation holes 81ai and 81bi piercing through the moving section 81 in the X direction are formed. The ventilation hole 81ai is formed in a position communicating with the inflow port 912ai of the holding main body section 91. The ventilation hole 81bi is formed in a position communicating with the inflow port 912bi of the holding main body section 91.

In the moving section 81, as shown in FIG. 9B, a projected section 811 and a pair of guide sections 812 are formed at the −Y side end portion. As shown in FIG. 9C, a projected section 813 and a pair of guide sections 814 are formed at the +Y side end portion.

The projected section 811 is formed in a position opposed to the support pin 913s of the holding main body section 91. The coil spring 82b supported by the support pin 913s is in contact with the projected section 811. The projected section 813 is formed in a position opposed to the support pin 914s of the holding main body section 91. The coil spring 82f supported by the support pin 914s is in contact with the projected section 813.

The pair of guide sections 812 is formed above and below the projected section 811. The respective guide sections 812 include U-shaped holes and U-shaped recessed sections formed at the peripheral edges of the holes. The U-shaped holes are formed in a size for allowing the shaft sections on the distal end sides in the guide shafts 913g to be inserted into the holes. The U-shaped recessed sections are formed in a size for allowing the heads of screws Ne inserted into the screw holes of the guide shafts 913g to engage with the recessed sections.

The pair of guide sections 814 is formed above and below the projected section 813. The respective guide sections 814 include U-shaped holes and U-shaped recesses same as those of the guide sections 812. The U-shaped holes are formed in a size for allowing the shaft sections on the distal end sides in the guide shafts 914g to be inserted into the holes. The U-shaped recessed sections are formed in a size for allowing the heads the screws Ne inserted into the screw holes of the guide shafts 914g to engage with the recessed sections.

In a state in which the coil springs 82b and 82f are supported by the support pins 913s and 914s, the guide shafts 913g and 914g are inserted into the U-shaped holes of the guide sections 812 and 814 and the screws Ne are inserted into the screw holes of the guide shafts 913g and 914g. The moving section 81 is supported by the holding main body section 91.

The coil springs 82b and 82f urge the moving section 81 in a direction away from the holding section 9L (the +X direction) in the X direction (the second direction).

The moving section 81 urged by the coil springs 82b and 82f is prevented from moving in the +X direction more than a predetermined distance by the heads of the screws Ne inserted into the screw holes of the guide shafts 913g and 914g. When force resisting the urging force of the coil springs 82b and 82f is applied to the moving section 81, the moving section 81 is guided by the guide shafts 913g and 914g to move in the −X direction.

As shown in FIG. 9A, the elastic members 83A and 83B are formed in an annular shape and disposed between the circulation forming section 912 and the moving section 81. The elastic members 83A and 83B are formed such that one end portions thereof surround the peripheral edges of the ventilation holes 81ai and 81bi and the other end portions thereof surround the peripheral edges of the inflow ports 912ai and 912bi. The elastic members 83A and 83B suppress a leak of the air between the ventilation holes 81ai and 81bi and the inflow ports 912ai and 912bi that communicate with each other. The elastic members 83A and 83B in this embodiment are attached to the peripheral edges of the inflow ports 912ai and 912bi via an adhesive material. The elastic members 83A and 83B are formed to be in contact with the moving section 81 in a state in which the circulating device 8L is attached to the light source device unit 30L. Note that the elastic members 83A and 83B may be attached to the peripheral edges of the ventilation holes 81ai and 81bi.

Figure 10A:
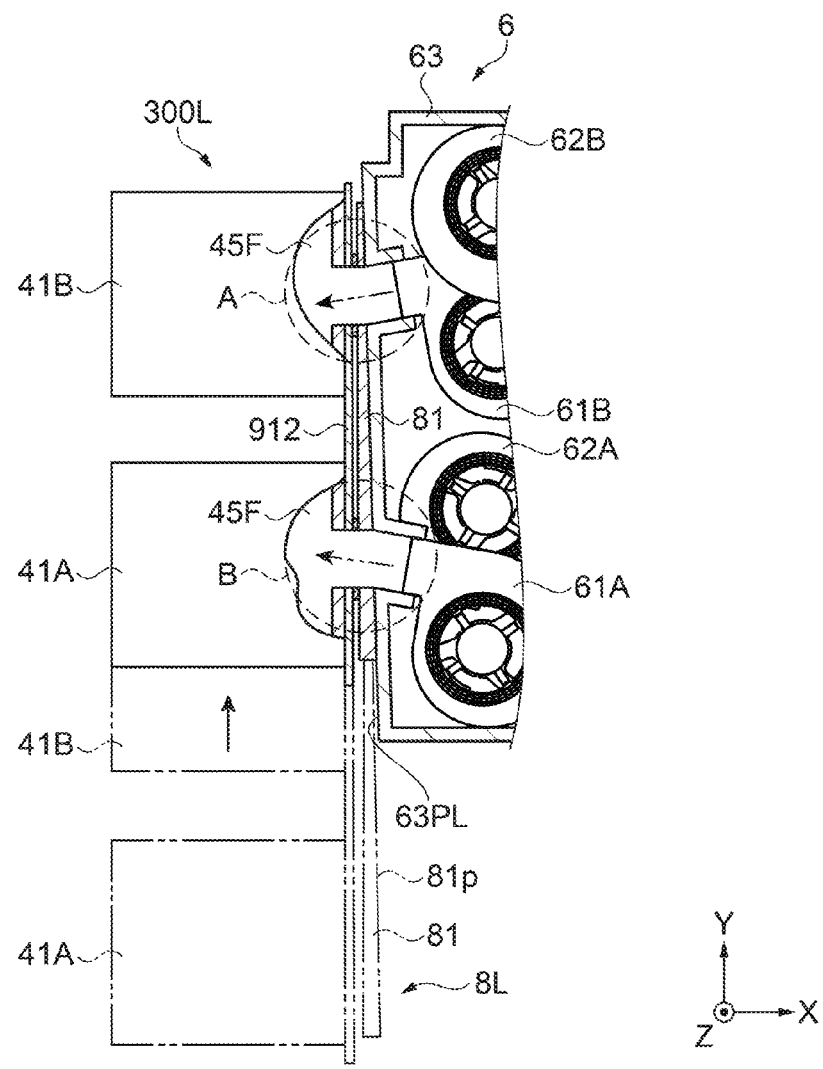
FIGS. 10A to 10C are schematic diagrams for explaining the operation of the circulating device at the time when the light-source attaching/detaching unit is attached and detached in the embodiment.
Figure 10B:
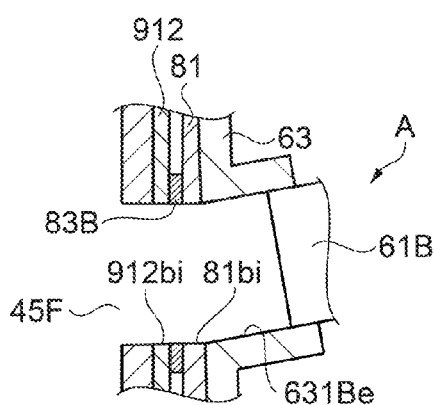
Figure 10C:
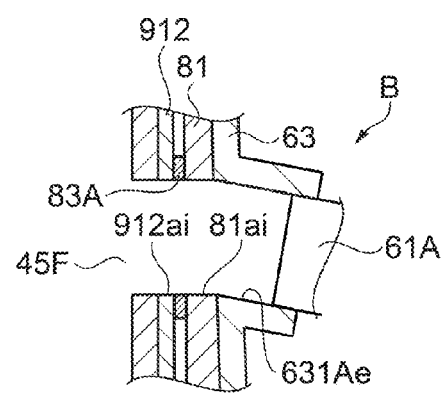

FIGS. 10A to 10C are schematic diagrams for explaining the operation of the circulating device 8L at the time when the light source attaching/detaching unit 300L is attached and detached. Specifically, FIG. 10A is a sectional view showing the cooling device 6, the moving section 81 in the first position and the second position of the light source attaching/detaching unit 300L, and the circulation forming section 912, FIG. 10B is an enlarged view of an A part in FIG. 10A, and FIG. 10C is an enlarged view of a B part in FIG. 10A. Note that, in FIG. 10A, the moving section 81 in the first position is indicated by an alternate long and short two dashes line and the moving section 81 in the second position is indicated by a solid line.

In the circulating device 8L, as shown in FIG. 10A, the moving section 81 is separated from the fan housing section 63 in the first position of the light source attaching/detaching unit 300L. The outflow surface 63PL of the fan housing section 63 and the plane 81P of the moving section 81 are formed to incline and to be substantially parallel to each other as explained above. Therefore, when the light source attaching/detaching unit 300L is slid in the +Y direction from the first position, the moving section 81 gradually approaches the fan housing section 63 and comes into contact with the fan housing section 63 before reaching the second position. When the light source attaching/detaching unit 300L is further slid in the +Y direction, the moving section 81 moves in the −X direction resisting the urging force of the coil springs 82*b* and 82*f* (see FIGS. 9B and 9C). As shown in FIG. 10A, the light source attaching/detaching unit 300L is positioned in the second position.

Although not shown in the figure, the light source attaching/detaching unit 300L positioned in the second position is fixed by screws and the position of the light source attaching/detaching unit 300L is maintained.

In the second position, in the moving section 81, as shown in FIGS. 10B and 10C, the ventilation holes 81*ai* and 81*bi* cause the outflow ports 631Ae and 631Be and the inflow ports 912*ai* and 912*bi* to communicate with each other.

In the second position, as shown in FIGS. 10B and 10C, the elastic members 83A and 83B are pressed and compressed by the moving section 81 and surely fill gaps between the peripheral edges of the ventilation holes 81*ai* and 81*bi* and the peripheral edges of the inflow ports 912*ai* and 912*bi*.

In this way, in the circulating device 8L, in the second position, the moving section 81 is disposed between the light source device unit 30L and the fan housing section 63 and the ventilation holes 81*ai* and 81*bi* cause the outflow ports 631Ae and 631Be and the inflow ports 912*ai* and 912*bi* to communicate with each other. Consequently, the circulating device 8L suppresses a leak of the air flowing out from the outflow ports 631Ae and 631Be and circulates the air to the light source device unit 30L.

The air blown from the cooling fan 61A passes through the outflow port 631Ae, the ventilation hole 81*ai*, and the inflow port 912*ai* and flows into the channel 45F of the light source device 41A. Similarly, the air blown from the cooling fan 61B passes through the outflow port 631Be, the ventilation hole 81*bi*, and the inflow port 912*bi* and flows into the channel 45F of the light source device 41B.

Referring back to FIG. 6, the air flowed into the channel 45F of the light source device 41B flows into the upper side in the housing main body section 440 from the channel forming section 450. The air flowed into the upper side in the housing main body section 440 is divided by a member on the inside of the housing main body section 440. Most of the air is blown toward the upper side of the luminous tube 411*a*. The remainder of the air is blown toward the distal end (the electrode 411*b*) of one sealing section.

Like the air flowed into the channel 45F of the light source device 41B, the air flowed into the channel 45F of the light source device 41A is blown toward the upper side of the luminous tube 411*a* and the distal end of one sealing section.

The air warmed by cooling the light sources 411 of the light source devices 41A and 41B flows out to the outside of the light source housing 430 via ventilation holes (not shown in the figure) respectively formed in the reflector 412 and the housing main body section 440. The air is discharged to the outside of the exterior housing 2 by a not-shown exhaust fan.

The light source attaching/detaching unit 300L positioned in the second position is capable of sliding in the direction of the first position (the −Y direction) when the screws are loosened. When the light source attaching/detaching unit 300L is slid in the −Y direction from the second position, the moving section 81 urged by the coil springs 82*b* and 82*f* gradually moves in the +X direction along the outflow surface 63PL of the fan housing section 63. Since movement of the moving section 81 equal to or larger than a predetermined distance is regulated by the screws Ne (see FIGS. 9B and 9C), the moving section 81 separates from the fan housing section 63 before reaching the first position. When the light source attaching/detaching unit 300L is further slid in the −Y direction, the light source attaching/detaching unit 300L is positioned in the first position as indicated by an alternate long and two short dashes line in FIG. 10A and can be detached from the supporting section 7. In the light source attaching/detaching unit 300L detached from the supporting section 7, the light source devices 41A and 41B can be detached from the holding section 9L.

In this way, the light source attaching/detaching unit 300L including the light source devices 41A and 41B is attached to and detached from the supporting section 7 by being slid in the Y direction (the first direction). The light source 411 is cooled by the air blown from the +X direction along the X direction (the second direction). Similarly, the light source attaching/detaching unit 300R including the light source devices 42A and 42B is attached to and detached from the supporting section 7 by being slid in the Y direction (the first direction). The light source 411 is cooled by the air blown from the −X direction along the X direction (the second direction).

As explained above, according to this embodiment, it is possible to obtain effects explained below.

(1) The lighting device 31 is capable of suppressing a leak of the air blown from the cooling device 6 and blowing the air to the light source device units 30L and 30R. Accordingly, it is possible to provide the lighting device 31 having a configuration in which the direction in which the light source device units 30L and 30R are slid to be attached and detached and the direction of the air blown from the cooling device 6 are crossing directions, the lighting device 31 being capable of cooling the light source 411 effectively using the air blown by the cooling device 6.

The moving section 81 moves when the light source attaching/detaching units 300L and 300R are slid. Therefore, it is unnecessary to provide a mechanism or an operation section for moving the moving section 81 into the projector 1. The moving section 81 does not project to the outer side of the lighting device 31. It is possible to achieve the effects explained above even if a moving amount is small. Accordingly, it is possible to provide the lighting device 31 with an increase in the size of the projector 1 suppressed without limiting the structure around the lighting device 31 in the projector 1.

(2) Since the projector 1 includes the lighting device 31, the projector 1 has a configuration in which the direction of the air blown from the cooling device 6 and the direction in which the light source attaching/detaching units 300L and 300R are attached and detached are crossing directions.

Further, since deterioration of the light source 411 is suppressed, it is possible to project an image for a long period.

(3) Since the circulating devices 8L and 8R include the elastic members 83A and 83B, it is possible to further suppress the gaps between the outflow ports 631Ae and 631Be and the inflow ports 912ai and 912bi. Accordingly, it is possible to cool the light source 411 more effectively using the air blown by the cooling device 6.

(4) The circulating devices 8L and 8R are supported by the light source device units 30L and 30R. The outflow surfaces 63PL and 63PR of the fan housing section 63 incline as explained above. Consequently, since the moving section 81 can be smoothly moved, it is possible to smoothly slide the light source device units 30L and 30R between the first position and the second position.

(5) The light source device units 30L and 30R include the holding sections 9L and 9R. In the holding sections 9L and 9R, the guide grooves 911g for enabling the holding sections 9L and 9R to slide with respect to the supporting section 7 are formed in the holding sections 9L and 9R. Consequently, it is possible to form the light source housing 430 without increasing strength more than necessary and with a complicated shape suppressed.

(6) Since the lighting device 31 includes the light source devices 41A, 41B, 42A, and 42B, the lighting device 31 can emit brighter light. The plurality of inflow ports formed in the holding sections 9L and 9R, the plurality of ventilation holes formed in the moving section 81, and the plurality of outflow ports formed in the fan housing section 63 are provided to correspond to the respective light source devices 41A, 41B, 42A, and 42B. Therefore, it is possible to blow the air to the respective light source devices 41A, 41B, 42A, and 42B in the same manner and cool the light sources 411 in the same manner.

The cooling device 6 includes the four cooling fans 61A, 61B, 62A, and 62B corresponding to the light source devices. Therefore, it is possible to more efficiently cool the light source devices.

(7) As explained above, the outflow ports 631Ae and 631Be formed on the outflow surface 63PL are disposed to at least partially overlap in the Z direction when viewed from the Y direction. The outflow ports formed on the outflow surface 63PR are also disposed to at least partially overlap in the Z direction when viewed from the Y direction. Consequently, it is possible to blow the air to the respective light source devices 41A, 41B, 42A, and 42B in the same manner according to the disposition positions in the Z direction of the light source devices 41A, 41B, 42A, and 42B.

It is possible to suppress a leak of the air without the necessity of providing projecting sections at the peripheral edges of the outflow ports 631Ae and 631Be and the outflow ports formed on the outflow surface 63PR. Therefore, it is possible to provide the lighting device 31 that can increase a degree of freedom of disposition of the outflow ports 631Ae and 631Be, that is, a degree of freedom of the disposition positions of the light source devices 41A, 41B, 42A, and 42B and cool the light sources 411 effectively using the air blown by the cooling device 6.

(8) Since the lighting device 31 includes the reflecting section 5, it is possible to change the direction of the lights emitted from the light source device units 30L and 30R and emit the lights to the outside of the lighting device 31.

(9) The cooling fans 61A, 61B, 62A, and 62B are configured by the sirocco fans. The sirocco fans have high discharge pressure of the cooling air compared with axial flow fans. Therefore, it is possible to concentratedly blow the air to the light source devices 41A, 41B, 42A, and 42B.

Modifications

The embodiment may be changed as explained below.

The lighting device 31 in the embodiment is configured such that the circulating devices 8L and 8R are supported by the light source device units 30L and 30R. However, a lighting device may be configured in which circulating devices are supported by an outflow section of a cooling device. In the case of this configuration, a moving section includes a plane opposed to a light source device unit and ventilation holes are formed on the plane. The plane may incline with respect to the first direction to further project to the light source device unit side as an opposed position of the plane and the moving section is further on the depth side when the light source device unit is slid from the first position to the second position.

Each of the light source device units 30L and 30R in the embodiment includes the two light source devices. However, the number of light source devices included in the light source device units 30L and 30R may be other than two. When a light source device unit includes one light source device, it is also possible that a holding section is not provided, an engaging section that engages with a supporting section to be capable of sliding is provided in a light source housing, and an inlet of a channel in the light source housing is configured as an inflow port.

The outflow surfaces 63PL and 63PR in the embodiment incline with respect to the Y direction (the first direction). However, the outflow surfaces 63PL and 63PR may be surfaces extending along the first direction as long as the distal end on the outflow surface side of the moving section is formed as an R surface or the like. In particular, in a light source device unit configured short in the first direction, for example, a light source device unit including one light source device, since a slide amount is small, this form is possible.

The lighting device 31 in the embodiment includes the two light source attaching/detaching units 300L and 300R. However, the lighting device 31 may include one light source attaching/detaching unit.

The lighting device 31 in the embodiment is disposed such that the optical axis of the light source 411 extends along the X direction (the second direction). However, the lighting device 31 may be disposed such that the optical axis of the light source 411 extends along the Y direction (the first direction). The lighting device 31 does not have to include the reflecting section 5.

The light source device units 30L and 30R in the embodiment are configured to be attached to and detached from the rear side of the projector 1. However, the light source device units 30L and 30R are not limited to this configuration and, for example, may be configured to be attached to and detached from the side surface side, the bottom surface side, or the upper surface side. When the light source device units 30L and 30R are attached to and detached from the side surface side, the X direction is the first direction. When the light source device units 30L and 30R are attached to and detached from the bottom surface side or the upper surface side, the Z direction is the first direction.

The outflow ports 631Ae and 631Be in the embodiment are disposed to at least partially overlap in the Z direction (the third direction) when viewed from the Y direction (the first direction). However, the outflow ports 631Ae and 631Be are not limited to this form. That is, the outflow ports 631Ae and 631Be may be disposed to substantially entirely overlap in the Z direction (the third direction), that is, in substantially the same positions in the Z direction (the third direction) when viewed from the Y direction (the first direction). The outflow ports 631Ae and 631Be may be disposed to be shifted from each other not to overlap in the Z direction (the third direction) when viewed from the Y direction (the first direction). The same applies to the two outflow ports formed on the outflow surface 63PR.

The moving section 81 and the elastic members 83A and 83B in the embodiment may be integrated and formed of an elastic member having hardness higher than the hardness of the elastic members 83A and 83B. For example, a member having a satisfactory lubricating property may be provided on the outflow surfaces 63PL and 63PR side of the elastic member.

The circulating devices 8L and 8R in the embodiment include the coil springs 82b and 82f as the urging sections. However, the circulating devices 8L and 8R are not limited to this. The circulating devices 8L and 8R may include leaf springs or the like as the urging sections.

The cooling device 6 in the embodiment includes the four cooling fans 61A, 61B, 62A, and 62B corresponding to the light source devices 41A, 41B, 42A, and 42B. However, the number of light source devices and the number of cooling fans may be different.

The light source housing 430 in the embodiment includes the housing main body section 440 and the channel forming section 450 that can be separated and attached and detached. However, the light source housing 430 may be configured to be attachable and detachable as one unit.

In the projector 1 in the embodiment, the liquid crystal panel of the transmission type is used as the light modulating device. However, a liquid crystal panel of a reflection type may be used. As the light modulating device, a light modulating device of a micromirror type, for example, a DMD (Digital Micromirror Device) may be used.

In the light modulating device in the embodiment, a so-called three-plate system is adopted in which three light modulating devices corresponding to the R light, the G light, and the B light are used. However, the light modulating device is not limited to this. A single-plate system may be adopted. Alternatively, the invention can also be applied to a projector including two or four or more light modulating devices.

What is claimed is:

1. A lighting device comprising:
a light source device unit including a light source;
a supporting section configured to support the light source device unit to be capable of sliding from a first position to a second position, which is a predetermined position of the light source device unit, in a first direction;
a cooling device including a cooling fan and an outflow section having formed therein an outflow port from which air emitted from the cooling fan flows out; and
a circulating device supported by the light source device unit or the outflow section and configured to circulate, in the second position, the air flowing out from the outflow port to the light source device unit, wherein
the light source device unit includes an inflow port opened in a direction along a second direction crossing the first direction and a channel that leads the air flowing in from the inflow port to the light source,
the outflow port is opened to a side opposed to the inflow port of the light source device unit in the second position, and
the circulating device includes:
a moving section disposed between the light source device unit and the outflow section in the second position, a ventilation hole for causing the outflow port and the inflow port to communicate being formed in the moving section; and
an urging section configured to urge, in the second direction, the moving section in a direction away from the light source device unit or the outflow section that supports the circulating device.

2. The lighting device according to claim 1, wherein
the circulating device further includes an annular elastic member,
the elastic member is disposed between the light source device unit or the outflow section, which supports the circulating device, and the moving section, an end portion on one side of the elastic member surrounding a peripheral edge of the ventilation hole and an end portion on the other side of the elastic member surrounding a peripheral edge of the inflow port or a peripheral edge of the outflow port.

3. The lighting device according to claim 1, wherein
the circulating device is supported by the light source device unit,
the outflow section includes an outflow surface opposed to the moving section in the second position, the outflow port being formed on the outflow surface, and
the outflow surface inclines with respect to the first direction to further project to the light source device unit side as an opposed position of the outflow surface and the moving section is further on a depth side when the light source device unit is slid from the first position toward the second position.

4. The lighting device according to claim 1, wherein
the circulating device is supported by the outflow section,
the moving section includes a plane opposed to the light source device unit, the ventilation hole being formed in the plane, and
the plane inclines with respect to the first direction to further project to the light source device unit side as an opposed position of the plane and the light source device unit is further on a depth side when the light source device unit is slid from the first position toward the second position.

5. The lighting device according to claim 1, wherein
the light source device unit is configured to be detachable from the supporting section in the first position, the light source device unit including:
a light source device including the light source and a light source housing that houses the light source and includes the channel; and
a holding section that holds the light source device and includes the inflow port.

6. The lighting device according to claim 5, wherein the holding section holds the light source device such that an optical axis of the light source extends along the second direction.

7. The lighting device according to claim 6, wherein
the light source device unit includes a plurality of the light source devices,
the plurality of light source devices emit lights to a same side and are held by the holding section along the first direction when viewed from a third direction crossing the first direction and the second direction,
a plurality of the inflow ports are provided to correspond to the channels of the respective plurality of light source devices, and
a plurality of the ventilation holes and a plurality of the outflow ports are provided to respectively correspond to the plurality of inflow ports.

8. The lighting device according to claim 7, wherein the plurality of outflow ports are disposed to at least partially overlap in the third direction when viewed from the first direction.

9. The lighting device according to claim 1, further comprising a reflecting section configured to reflect light emitted from the light source device unit.

10. A projector comprising:
the lighting device according to claim 1;
a light modulating device configured to modulate light emitted from the lighting device; and
a projection optical device configured to project the light modulated by the light modulating device.

11. A projector comprising:
the lighting device according to claim 2;
a light modulating device configured to modulate light emitted from the lighting device; and
a projection optical device configured to project the light modulated by the light modulating device.

12. A projector comprising:
the lighting device according to claim 3;
a light modulating device configured to modulate light emitted from the lighting device; and
a projection optical device configured to project the light modulated by the light modulating device.

13. A projector comprising:
the lighting device according to claim 4;
a light modulating device configured to modulate light emitted from the lighting device; and
a projection optical device configured to project the light modulated by the light modulating device.

14. A projector comprising:
the lighting device according to claim 5;
a light modulating device configured to modulate light emitted from the lighting device; and
a projection optical device configured to project the light modulated by the light modulating device.

15. A projector comprising:
the lighting device according to claim 8;
a light modulating device configured to modulate light emitted from the lighting device; and
a projection optical device configured to project the light modulated by the light modulating device.

16. A projector comprising:
the lighting device according to claim 9;
a light modulating device configured to modulate light emitted from the lighting device; and
a projection optical device configured to project the light modulated by the light modulating device.

17. A projector comprising:
the lighting device according to claim 10;
a light modulating device configured to modulate light emitted from the lighting device; and
a projection optical device configured to project the light modulated by the light modulating device.

18. A light-source-device supporting instrument to which a light source device is attached, the light-source-device supporting instrument comprising:
a holding section configured to hold the light source device; and
a circulating device supported by the holding section, wherein
the holding section includes an engaging section with which the light-source-device supporting instrument is engaged to be capable of sliding along a first direction and an inflow port opened in a direction along a second direction crossing the first direction,
the circulating device includes:
a moving section disposed on an opposite side of the light source device in the holding section, a ventilation hole communicating with the inflow port being formed in the moving section; and
an urging section configured to urge, in the second direction, the moving section in a direction away from the holding section.

19. A light source cartridge comprising:
the light-source-device supporting instrument according to claim 18; and
a channel forming section provided on an opposite side of the moving section in the holding section and including a channel communicating with the inflow port.

* * * * *